(12) United States Patent
Spada

(10) Patent No.: US 7,546,526 B2
(45) Date of Patent: Jun. 9, 2009

(54) EFFICIENT EXTENSIBLE MARKUP LANGUAGE NAMESPACE PARSING FOR EDITING

(75) Inventor: Peter Spada, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 532 days.

(21) Appl. No.: 11/017,879

(22) Filed: Dec. 20, 2004

(65) Prior Publication Data

US 2006/0136814 A1  Jun. 22, 2006

(51) Int. Cl.
*G06F 17/00* (2006.01)

(52) U.S. Cl. ...................... 715/234; 707/101

(58) Field of Classification Search ............... 715/513, 715/530, 531, 234; 707/101
See application file for complete search history.

(56) References Cited

U.S. PATENT DOCUMENTS

| | | | | | |
|---|---|---|---|---|---|
| 6,671,853 | B1* | 12/2003 | Burkett et al. | ............... | 715/513 |
| 6,675,353 | B1* | 1/2004 | Friedman | ............... | 715/239 |
| 6,763,499 | B1* | 7/2004 | Friedman et al. | ............ | 715/240 |
| 6,795,854 | B1* | 9/2004 | Parker et al. | ................ | 709/223 |
| 6,874,121 | B1* | 3/2005 | Mayer | ......................... | 715/513 |
| 6,941,511 | B1* | 9/2005 | Hind et al. | .................. | 715/235 |
| 7,120,864 | B2* | 10/2006 | Cai et al. | ..................... | 715/234 |
| 7,330,971 | B1* | 2/2008 | Kukreja et al. | .............. | 713/168 |
| 7,386,860 | B2* | 6/2008 | Dani et al. | .................. | 719/315 |
| 2003/0046317 | A1* | 3/2003 | Cseri et al. | ................. | 707/513 |
| 2003/0167277 | A1* | 9/2003 | Hejlsberg et al. | ........... | 707/102 |
| 2003/0172348 | A1* | 9/2003 | Fry et al. | ..................... | 715/513 |
| 2003/0237046 | A1* | 12/2003 | Parker et al. | ................ | 715/513 |
| 2004/0006741 | A1* | 1/2004 | Radja et al. | ................. | 715/513 |
| 2004/0199547 | A1* | 10/2004 | Winter et al. | ............... | 707/200 |
| 2004/0210599 | A1* | 10/2004 | Friedman et al. | ............ | 707/105 |
| 2004/0233237 | A1* | 11/2004 | Randow | ...................... | 345/763 |
| 2005/0120029 | A1* | 6/2005 | Tomic et al. | ................. | 707/100 |
| 2005/0166140 | A1* | 7/2005 | Cai et al. | ..................... | 715/513 |
| 2005/0177812 | A1* | 8/2005 | Andrew et al. | .............. | 717/100 |
| 2006/0005122 | A1* | 1/2006 | Lemoine | ...................... | 715/513 |
| 2006/0010369 | A1* | 1/2006 | Naundorf et al. | ............ | 715/513 |
| 2006/0010372 | A1* | 1/2006 | Kaler et al. | .................. | 715/513 |
| 2006/0030292 | A1* | 2/2006 | Bosworth et al. | ........... | 455/408 |
| 2006/0069985 | A1* | 3/2006 | Friedman et al. | ............ | 715/513 |
| 2006/0200488 | A1* | 9/2006 | Chu-Carroll et al. | ........ | 707/102 |

(Continued)

OTHER PUBLICATIONS

W3C, "Namespaces in XML", pp. 1-11, Jan. 14, 1999, Available: http://www.w3.org/TR/1999/REC-xml-names-19990114.*

(Continued)

*Primary Examiner*—Rachna S Desai
(74) *Attorney, Agent, or Firm*—Merchant & Gould

(57) ABSTRACT

Methods and computer products provide for an efficient XML namespace analysis and parsing. Extensible Markup Language (XML) structure of an XML document is passed through an XML parser as plain text, and the result is an internal data structure that represents the XML. The XML parser keeps track of all mappings of prefixes-to-namespaces as it is parsing the tree of XML tags in the text. A design tool application may be use to modify the parsed data structure by moving XML tags to different locations, by adding new XML tags, or by deleting XML tags. After modifications are complete, and the user wants to save a file, the XML may be re-written as text. The mappings of prefixes-to-namespaces are advantageous during output so that each XML tag is associated with the correct prefix.

20 Claims, 5 Drawing Sheets

U.S. PATENT DOCUMENTS

2006/0282501 A1* 12/2006 Bhogal et al. ............... 709/203
2007/0299854 A1* 12/2007 Bohlmann et al. .......... 707/100
2008/0216052 A1   9/2008 Hejlsberg et al. ........... 717/114
2008/0270409 A1* 10/2008 Naito et al. .................. 707/10

OTHER PUBLICATIONS

W3C, "Canonical XML Version 1.0", pp. 1-22, Mar. 15, 2001, Available: http://www.w3.org/TR/2001/REC-xml-c14n-20010315.*

* cited by examiner

```
XML DOCUMENT                                              ⎫ 210
                                                          ⎬
    <x:root xmlns:x="foo">  ～215                         ⎭
        <x:tag1></x:tag1>  ～220
        <y:tag2 xmlns:y="bar">  ～230
            <x:tag1></x:tag1>
        </y:tag2>
    </x:root>         ～240
```

*Fig. 2*

EFFICIENT EXTENSIBLE MARKUP LANGUAGE NAMESPACE PARSING FOR EDITING

FIELD OF THE INVENTION

The present invention generally relates to use of structured documents. More particularly, the present invention relates to efficient Extensible Markup Language namespace parsing for editing.

BACKGROUND OF THE INVENTION

With the advent of the computer age, computer and software users have grown accustomed to user-friendly software applications that help then write, calculate, organize, prepare presentations, send and receive electronic mail, make music, and the like. For example, modern electronic word processing applications allow users to prepare a variety of useful documents. Modern spreadsheet applications allow users to enter, manipulate, and organize data. Modern electronic slide presentation applications allow users to create a variety of slide presentations containing text, pictures, data or other useful objects.

In many cases, it is advantageous to structure documents created by such applications according to a structured markup language such as the Extensible Markup Language (XML). An XML-structured document typically consists of a tree of XML tags, and each tag has a prefix and a name. The prefixes of the XML tags are mapped to XML namespaces based on tag attributes in the Extensible Markup Language that define the mapping between a given tag and an associated namespace. This mapping of prefixes to namespaces can change throughout an XML tree. A prefix mapping at one point in a given XML structure may not be valid at another point. Or, that prefix may map to a completely different namespace. One problem includes maintaining these prefix-to-namespace mappings throughout the tree of XML tags. Because parsing performance is important, maintaining prefix-to-namespace mappings needs to be done efficiently.

Prior methods and systems of XML namespace parsing have been used for generating a tree of prefix-to-namespace mappings. Each node in the tree points to a start tag where the namespace comes into scope and a pointer to the end tag where the namespace goes out of scope. Such prior methods are not very efficient because to determine what namespaces are in scope at any point, a user must traverse upwards through the tree of mappings and collect namespaces along the way. Another problem is associated with the fact that the tree of namespaces is separate from the tree of XML tags, and keeping the tree of namespaces and the tree of XML tags in synchronization with each other is time-consuming, tedious, and inefficient.

It is with respect to these and other considerations that the present invention has been made.

SUMMARY OF THE INVENTION

Embodiments of the present invention solve the above and other problems by providing an efficient XML namespace analysis including a prefix-to-namespace mapping of XML tags of an XML document to associated XML namespaces. According to one embodiment of the present invention, XML structure of an XML document is passed through an XML parser as plain text, and the result is an internal data structure that represents the XML. The XML parser keeps track of all mappings of prefixes-to-namespaces as it is parsing the tree of XML tags in the text. Accordingly, a user may use a design tool application to modify the parsed data structure, by moving XML tags to different locations, by adding new XML tags, or by deleting XML tags. After modifications are complete, and the user wants to save a file, the XML may be re-written as text. The mappings of prefixes-to-namespaces are advantageous during output so that each XML tag is associated with the correct prefix.

These and other features and advantages, which characterize the present invention, will be apparent from a reading of the following detailed description and a review of the associated drawings. It is to be understood that both the foregoing general description and the following detailed description are exemplary and are explanatory only and are not restrictive of the invention as claimed.

BRIEF DESCRIPTION OF THE DRAWINGS

FIG. 2 illustrates a computer-generated document structured using elements of the Extensible Markup Language.

DETAILED DESCRIPTION

As briefly described above, embodiments of the present invention are directed to methods and computer products for providing an efficient XML namespace analysis and parsing. Extensible Markup Language (XML) structure of an XML document is passed through an XML parser as plain text, and the result is an internal data structure that represents the XML. The XML parser keeps track of all mappings of prefixes-to-namespaces as it is parsing the tree of XML tags in the text. A design tool application may be use to modify the parsed data structure by moving XML tags to different locations, by adding new XML tags, or by deleting XML tags. After modifications are complete, and the user wants to save a file, the XML may be re-written as text. The mappings of prefixes-to-namespaces are advantageous during output so that each XML tag is associated with the correct prefix. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
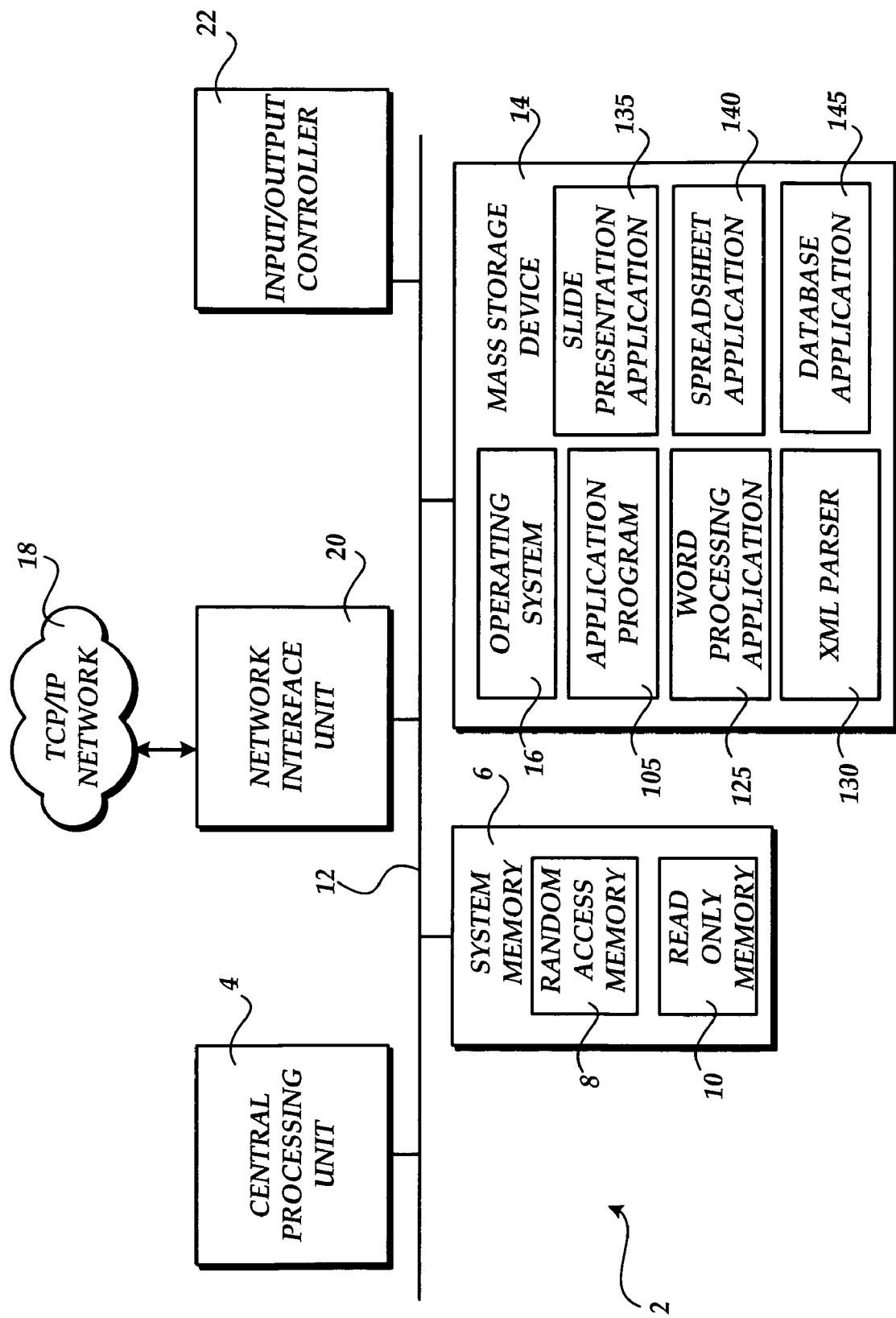
FIG. 1 is a block diagram showing the architecture of a personal computer that provides an illustrative operating environment for embodiments of the present invention.

Referring now to the drawings, in which like numerals refer to like elements through the several figures, aspects of the present invention and an exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 105, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application program 105 for providing a variety of functionalities to a user. For instance, the application program 105 may comprise many types of programs such as a word processing application, a spreadsheet application, a desktop publishing application, and the like. According to an embodiment of the present invention, the application program 105 comprises a multiple functionality software application suite for providing functionality from a number of different software applications. Some of the individual program modules that may comprise the application suite 105 include a word processing application 125, a slide presentation application 135, a spreadsheet application 140 and a database application 145. An example of such a multiple functionality application suite 105 is OFFICE manufactured by Microsoft Corporation. Other software applications illustrated in FIG. 1 include an Extensible Markup Language (XML) parser 130.

Efficient XML Namespace Parsing and Editing

According to embodiments of the present invention, every parsed XML tag in an XML document holds a pointer to an array of prefix-to-namespace mappings. Preferably, the array contains all of the namespaces that are in scope at that tag's position within the XML document. This eliminates the need to iterate through an XML tree to find out what namespaces are active at any point in the XML document. All XML tags that have the same namespaces in scope share the same array of prefix-to-namespace mappings. According to an embodiment of the invention, the array is a reference counted array. For purposes of description the array is referred to as a namespace table throughout the rest of this description.

FIG. 2 illustrates a computer-generated document structured using elements of the Extensible Markup Language. The XML document 210, illustrated in FIG. 2, includes a number of XML tags 215, 220, 230, 240. The XML tags, for example, <x:tag1>, are applied to the document either automatically or by user action. An XML-structured document typically consists of a tree of XML tags, and each tag has a prefix and a name. For example the tag <x:tag1>, illustrated in FIG. 2, has a tag name of "tag1" and a tag prefix of "x:." The prefixes of the XML tags are mapped to XML namespaces based on tag attributes in the Extensible Markup Language that define the mapping between a given tag and an associated namespace. For example, as illustrated in FIG. 2, the tag <x:tag1> is mapped to the namespace "foo," and the tag <y:tag2> is mapped to the namespace "bar."

Figure 3:
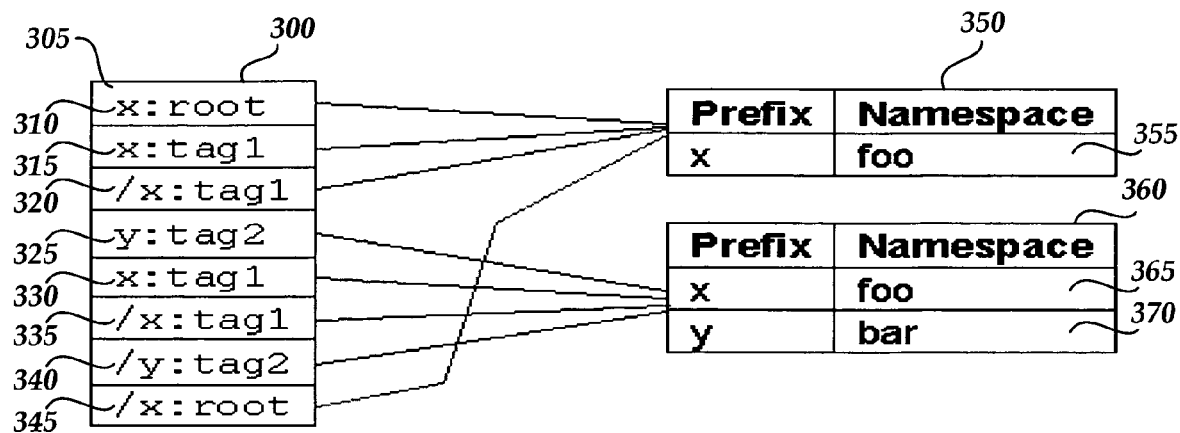
FIG. 3 is a simplified block diagram illustrating the mapping of XML prefixes to XML namespaces according to embodiments of the present invention.

Referring now to FIG. 3, according to embodiments of the present invention, an XML document, such as the document 210, illustrated in FIG. 2, is passed through an XML parsing application 130, illustrated in FIG. 1. The output of the XML parser 130 is an array 300 of XML tags found in the document by the XML parser 130. Each cell in the array 300 represents an object that is the parsed XML tag. As illustrated in FIG. 3, the array 300 includes a tag "x:root" 310, a tag "x:tag1" 315, a tag "/x:tag1" 320, a tag "y:tag2" 325, and so on. After the XML document has been parsed, the namespace of each tag has yet to be determined, and only the tag prefixes are known so far, for example "x:" and "y:."

According to embodiments of the present invention, each tag is provided a namespace table. When the first tag is parsed, a first namespace table 350 is created for the first tag. Referring to FIG. 3, the second tag does not register a new namespace from the first tag, so the namespace table 350 is shared by the first tag 310 and the second tag 315. When the tag "y:tag2" is reached by the parser, a new namespace table 360 is generated which includes the new namespace "bar". This new namespace table is generated by copying the previous namespace table, which included the namespace "foo", and adding a new entry for the namespace "bar". When the tag "x:tag1" 330 is reached, the parser 130 does not recognize a new namespace because, as illustrated in FIG. 2, "x:tag1" 330 does not contain an attribute that defines a new namespace. Accordingly, the "x:tag1" 330 gets mapped to the second namespace table 360.

As illustrated in FIG. 3, the namespace "bar" goes out of scope when the parser 130 reaches the end tag "y:tag2" 340 because the matching start tag for "y:tag2" 325 defined the namespace "bar." That is, because the tag "/x:root" 345 is out of scope of the namespace "bar," the line between the tag 345 and the namespace table 350 shows how a previous namespace table may be reused when another table goes out of scope. When the previous namespace table is reused, that table becomes the current namespace table. In order to make the previous namespace table the current table, the parser 130 keeps track of all the current namespace tables that have ever been current. Before the parser reaches the tag 345, the current table is the table 360 having two prefix-to-namespace mappings. When the parser reaches the tag 345 out of scope of the "bar" namespace, the current table 360 is removed from the stack of current tables, and the first table 350 is designated as the current table.

Figure 4:
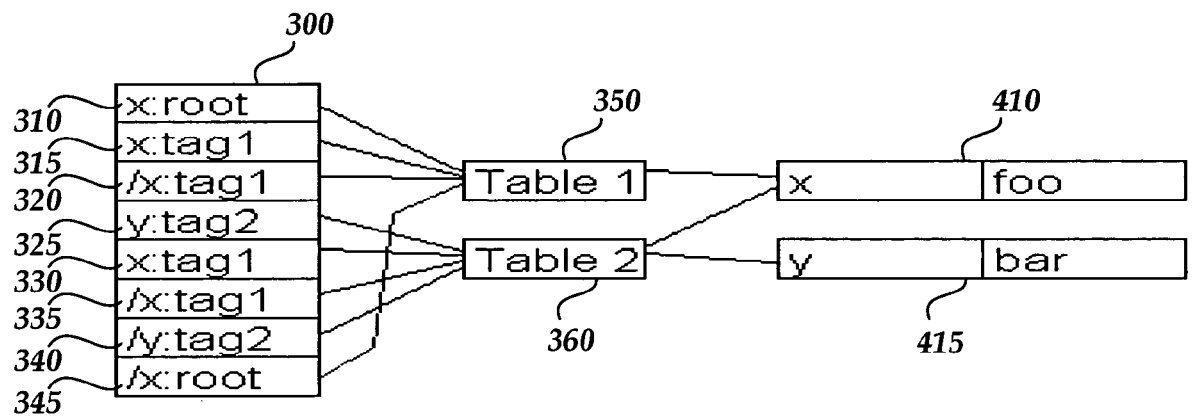
FIG. 4 is a simplified block diagram illustrating the mapping of XML prefixes to XML namespaces according to embodiments of the present invention.

After a namespace table for a tag is determined, as illustrated in FIG. 3, the prefixes for each tag may be mapped to a namespace, and that namespace will be stored in the object that represents the tag. The namespace table will store all prefixes in sorted order so that the search is binary. Because a namespace table contains all of the data from a previous namespace table, there will be redundant data in the namespace tables. For example, referring to FIG. 3, the prefix of "x" and the namespace of "foo" are stored in both tables 350, 360. As should be understood, less memory is used if both tables share data. FIG. 4 illustrates the sharing of data between two namespace tables. As illustrated in FIG. 4, each table includes a number of pointers to the mappings of prefix to namespace 410, 415. Each mapping is reference counted and may be held by multiple namespace tables.

Figure 5:
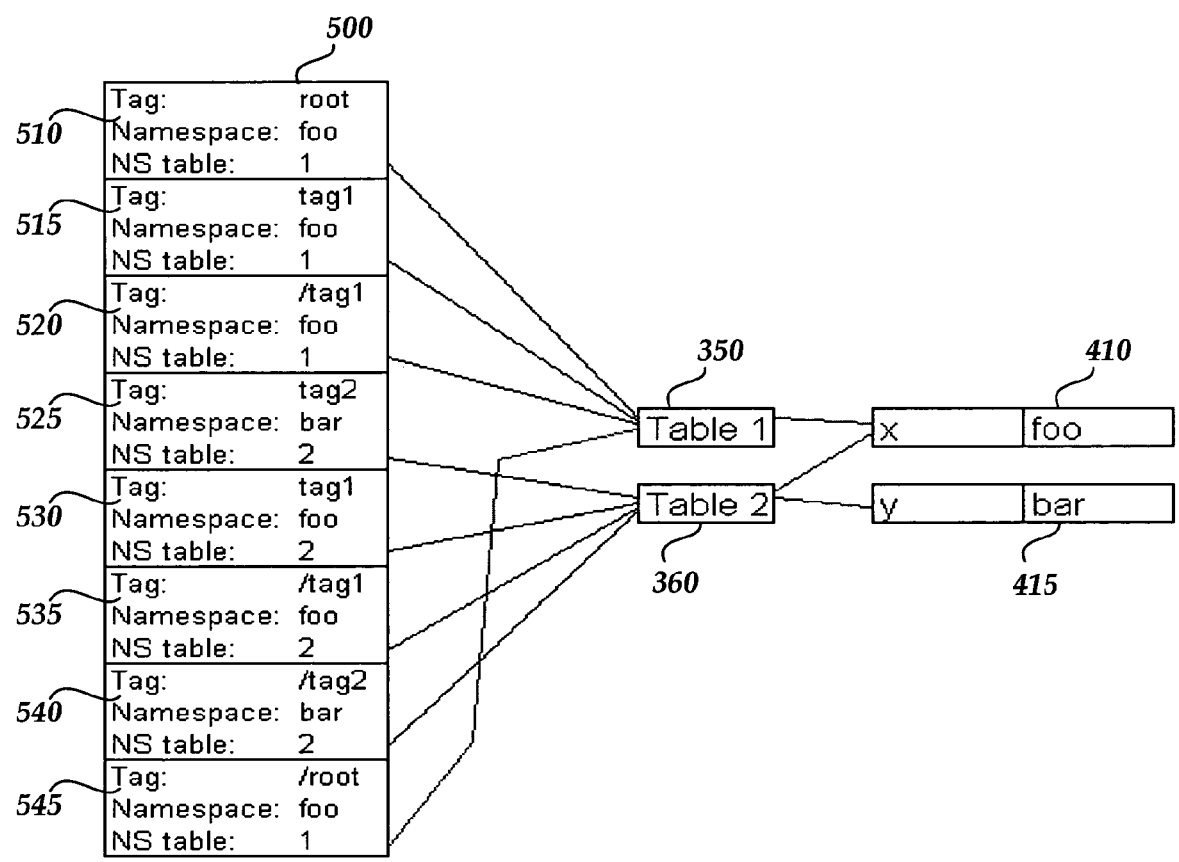
FIG. 5 is a simplified block diagram showing a final output of an XML parser showing an array of XML tags mapped to associated XML namespaces and XML prefixes according to embodiments of the present invention.

Referring to FIG. 5, the final output of the XML parser 130 is an array of tags 500 that contain at least three pieces of data, including the tag name (without a prefix), the namespace name and a pointer to the namespace table to which the tag is mapped. After parsing is completed, the data structure (array of tags) can be edited. New tags may be added, tags may be deleted, or tags may be moved to different locations. During editing, the namespace tables do not need to be used.

According to embodiments of the present invention, once it is time to output the data structures back to XML text (for saving to disk), then the namespace tables are used again. First the namespace tables are recreated. In order to recreate the namespace tables, for each XML tag in the XML document, the namespace table from the parent tag, if any, of each XML tag is obtained and is stored. Next, if the current tag has XML namespace attributes for registering a new namespace, then a copy of the parent tag's namespace table is made and prefix-to-namespace mappings are added into the new table for the associated (child) XML tag. Now that each XML tag has an updated namespace table, it may be output as text. The namespace table is used to map the tag's namespace back to a prefix. If no prefix exists for a namespace, one can be added (in the namespace table and as an attribute). Preference is given to the prefix that the tag originally had when it was parsed.

As described herein, instead of having a tree of namespaces, every parsed XML tag in an XML document holds a pointer to an array of prefix-to-namespace mappings. Thus, the need to iterate through an XML tree to find out what namespaces are active at any point in the XML document is eliminated. That is, a quick review of the final output array 500, illustrated in FIG. 5, allows a user to know the identity of a tag, the namespace to which the tag belongs, and the namespace table for pointing to a prefix-to-namespace mapping for the tag. And, XML tags that have the same namespaces in scope share the same array of prefix-to-namespace mappings. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

I claim:

1. A computer-implemented method for creating and managing Extensible Markup Language (XML) namespaces associated with an XML document, the method comprising:

receiving the XML document on a computer;

parsing the XML document for locating at least one XML tag applied to the XML document;

parsing the at least one XML tag to determine a prefix associated with the at least one XML tag and a namespace associated with the at least one XML tag;

building a namespace table for mapping the prefix associated with the at least one XML tag to the namespace associated with the at least one XML tag, wherein building the namespace comprises:

creating the namespace table associated with the at least one XML tag, mapping the prefix associated with at least one XML tag to the namespace table, determining whether at least one additional XML tag should be associated with the namespace table, in response to determining that the at least one additional XML tag should be associated with the namespace table, determining whether a prefix associated with the at least one additional XML tag is mapped to the namespace table, in response to determining that the prefix associated with the at least one additional XML tag is not mapped to the namespace table, mapping the prefix associated with the at least one additional XML tag to the namespace table, and storing each of the mapped prefixes in the namespace table in sorted order;

building an XML output array, wherein the XML output array provides an identification for the at least one XML tag, a namespace identification for the at least one XML tag, and a pointer to the namespace table for the at least one XML tag;

allowing modification of the at least one XML tag contained in the XML output array; and rewriting the parsed XML document to text after allowing modification of the at least one XML tag contained in the XML output array, wherein rewriting the parsed XML document to text after allowing modification of the at least one XML tag comprises:
   recreating the namespace table associated with the at least one XML tag,
   determining whether the at least one XML tag has at least one attribute for registering a new namespace,
   upon determination that the at least one XML tag has at least one attribute for registering the new namespace, updating the prefix associated with the at least one XML tag and creating a new namespace table for the at least one XML tag; and
   outputting the parsed XML document to text.

2. The method of claim 1, wherein prior to building the namespace table for mapping the prefix associated with the at least one XML tag to the namespace associated with the at least one XML tag, building an XML tags array, wherein the array is comprised of a cell for each XML tag parsed from the XML document, and wherein each cell represents an object associated with a given XML tag.

3. The method of claim 1, wherein building the namespace table for mapping the prefix associated with the at least one XML tag to the namespace associated with the at least one XML tag includes building the namespace table for as many different namespaces as are registered for the XML document.

4. The method of claim 1, wherein building the namespace table for mapping the prefix associated with the at least one XML tag to the namespace associated with the at least one XML tag includes building the namespace table containing multiple mappings of a one tag prefix to different namespaces.

5. The method of claim 1, further comprising:
   if the XML document is written to text after any modification of the at least one XML tag contained in the XML output array, applying the modification of the at least one XML tag contained in the XML output array to the XML document when the XML document is written to text.

6. The method of claim 5, wherein allowing modification of the at least one XML tag contained in the XML output array includes allowing an addition of at least one new XML tag to the XML output array.

7. The method of claim 5, wherein allowing modification of the at least one XML tag contained in the XML output array includes allowing a deletion of the at least one XML tag from the XML output array.

8. The method of claim 5, wherein allowing modification of the at least one XML tag contained in the XML output array includes allowing movement of the at least one XML tag from one location in the XML output array to another location in the XML output array.

9. A system for creating and managing Extensible Markup Language (XML) namespaces associated with an XML document, the system comprising:
   a memory storage; and
   a processing unit coupled to the memory storage, wherein the processing unit is operative to:
   receiving the XML document;
   parsing the XML document for locating at least one XML tag applied to the XML document;
   parsing the at least one XML tag to determine a prefix associated with the at least one XML tag and a namespace associated with the at least one XML tag;
   building a namespace table for mapping the prefix associated with the at least one XML tag to the namespace associated with the at least one XML tag, wherein building the namespace table comprises:
     creating the namespace table associated with the at least one XML tag,
     mapping the prefix associated with at least one XML tag to the namespace table,
     determining whether at least one additional XML tag should be associated with the namespace table,
     in response to determining that the at least one additional XML tag should be associated with the namespace table, determining whether a prefix associated with the at least one additional XML tag is mapped to the namespace table,
     in response to determining that the prefix associated with the at least one additional XML tag is not mapped to the namespace table, mapping the prefix associated with at least one additional XML tag to the namespace table, and
     storing each of the mapped prefixes in the namespace table in sorted order;
   building an XML output array, wherein the XML output array provides an identification for the at least one XML tag, a namespace identification for the at least one XML tag, and a pointer to the namespace table for the at least one XML tag;
   allowing modification of the at least one XML tag contained in the XML output array; and
   rewriting the parsed XML document to text after allowing modification of the at least one XML tag contained in the XML output array utilizing the XML output array for ensuring that the at least one XML tag in the XML document is matched to a correct XML tag prefix, wherein rewriting the parsed XML document to text after allowing modification of the at least one XML tag comprises:
     recreating the namespace table associated with the at least one XML tag,
     determining whether the at least one XML tag has at least one attribute for registering a new namespace,
     upon determination that the at least one XML tag has at least one attribute for registering the new namespace, updating the prefix associated with the at least one XML tag and creating a new namespace table for the at least one XML tag; and
     outputting the parsed XML document to text.

10. The system of claim 9, wherein prior to building the namespace table for mapping the prefix associated with the at least one XML tag to the namespace associated with the at least one XML tag, building an XML tags array, wherein the array is comprised of a cell for each XML tag parsed from the XML document, and wherein each cell represents an object associated with a given XML tag.

11. The system of claim 9, wherein building the namespace table for mapping the prefix associated with the at least one XML tag to the namespace associated with the at least one XML tag includes building the namespace table for as many different namespaces as are registered for the XML document.

12. The system of claim 9, further comprising:
   if the XML document is written to text after any modification of the at least one XML tag contained in the XML output array, applying the modification of the at least one XML tag contained in the XML output array to the XML document when the XML document is written to text.

13. A computer-readable storage medium on which is stored computer-executable instructions to perform the steps for creating and managing Extensible Markup Language (XML) namespaces associated with an XML document, said steps comprising:

receiving the XML document on a computer;

parsing the XML document for locating at least one XML tag applied to the XML document;

parsing the at least one XML tag to determine a prefix associated with the at least one XML tag and a namespace associated with the at least one XML tag;

building a namespace table for mapping the prefix associated with the at least one XML tag to the namespace associated with the at least one XML tag, wherein building the namespace comprises:

creating the namespace table associated with the at least one XML tag, mapping the prefix associated with at least one XML tag to the namespace table, determining whether at least one additional XML tag should be associated with the namespace table, in response to determining that the at least one additional XML tag should be associated with the namespace table, determining whether a prefix associated with the at least one additional XML tag is mapped to the namespace table, in response to determining that the prefix associated with the at least one additional XML tag is not mapped to the namespace table, mapping the prefix associated with the at least one additional XML tag to the namespace table, and storing each of the mapped prefixes in the namespace table in sorted order;

building an XML output array, wherein the XML output array provides an identification for the at least one XML tag, a namespace identification for the at least one XML tag, and a pointer to the namespace table for the at least one XML tag;

allowing modification of the at least one XML tag contained in the XML output array; and rewriting the parsed XML document to text after allowing modification of the at least one XML tag contained in the XML output array, wherein rewriting the parsed XML document to text after allowing modification of the at least one XML tag comprises:

recreating the namespace table associated with the at least one XML tag, determining whether the at least one XML tag has at least one attribute for registering a new namespace, upon determination that the at least one XML tag has at least one attribute for registering the new namespace, updating the prefix associated with the at least one XML tag and the namespace associated with the at least one XML tag and creating a new namespace table for the at least one XML tag; and outputting the parsed XML document to text.

14. The computer-readable storage medium of claim 13, wherein prior to building the namespace table for mapping the prefix associated with the at least one XML tag to the namespace associated with the at least one XML tag, building an XML tags array, wherein the array is comprised of a cell for each XML tag parsed from the XML document, and wherein each cell represents an object associated with a given XML tag.

15. The computer-readable storage medium of claim 13, wherein building the namespace table for mapping the prefix associated with the at least one XML tag to the namespace associated with the at least one XML tag includes building the namespace table for as many different namespaces as are registered for the XML document.

16. The computer-readable storage medium of claim 13, wherein building the namespace table for mapping the prefix associated with the at least one XML tag to the namespace associated with the at least one XML tag includes building the namespace table containing multiple mappings of a one tag prefix to different namespaces.

17. The computer-readable storage medium of claim 13, further comprising:

if the XML document is written to text after any modification of the at least one XML tag contained in the XML output array, applying the modification of the at least one XML tag contained in the XML output array to the XML document when the XML document is written to text.

18. The computer-readable storage medium of claim 17, wherein allowing modification of the at least one XML tag contained in the XML output array includes allowing an addition of at least one new XML tag to the XML output array.

19. The computer-readable storage medium of claim 17, wherein allowing modification of the at least one XML tag contained in the XML output array includes allowing a deletion of the at least one XML tag from the XML output array.

20. The computer-readable storage medium of claim 17, wherein allowing modification of the at least one XML tag contained in the XML output array includes allowing movement of the at least one XML tag from one location in the XML output array to another location in the XML output array.

\* \* \* \* \*